(12) United States Patent
Datz et al.

(10) Patent No.: US 8,654,627 B2
(45) Date of Patent: Feb. 18, 2014

(54) DATA-PATH DYNAMIC LINK MAINTENANCE IN MOBILE AD HOC NETWORKS

(75) Inventors: Charles Datz, Victor, NY (US); Ngan-cheung Pun, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 1434 days.

(21) Appl. No.: 11/619,450

(22) Filed: Jan. 3, 2007

(65) Prior Publication Data

US 2008/0159151 A1    Jul. 3, 2008

(51) Int. Cl.
*H04L 1/00* (2006.01)

(52) U.S. Cl.
USPC .......................................... 370/217

(58) Field of Classification Search
None
See application file for complete search history.

(56) References Cited

U.S. PATENT DOCUMENTS

| | | | |
|---|---|---|---|
| 5,412,654 A | 5/1995 | Perkins | 370/94.1 |
| 6,304,556 B1 | 10/2001 | Haas | 370/254 |
| 6,584,080 B1 | 6/2003 | Ganz et al. | 370/315 |
| 6,609,002 B1 | 8/2003 | Krishnamurthy et al. | 455/428 |
| 6,621,805 B1 | 9/2003 | Kondylis et al. | 370/329 |
| 6,675,128 B1 | 1/2004 | Hellerstein | 702/182 |
| 6,748,233 B1 | 6/2004 | Arnold et al. | 455/522 |
| 6,973,039 B2 | 12/2005 | Redi et al. | 370/238 |
| 2004/0029553 A1* | 2/2004 | Cain | 455/403 |
| 2004/0218548 A1 | 11/2004 | Kennedy et al. | 370/254 |
| 2004/0218582 A1 | 11/2004 | Kennedy et al. | 370/351 |
| 2004/0219909 A1 | 11/2004 | Kennedy et al. | 455/422 |
| 2005/0201340 A1* | 9/2005 | Wang et al. | 370/337 |
| 2006/0104219 A1 | 5/2006 | Kennedy | 370/254 |
| 2006/0268688 A1* | 11/2006 | Isozu | 370/227 |

FOREIGN PATENT DOCUMENTS

WO    2006/006117    1/2006    ............ H04L 12/56

OTHER PUBLICATIONS

Sakurai et al., "AODV Multipath Extension Using Source Route Lists with Optimized Route Establishment", Waseda University, Japan; Int'l Workshop on Wireless Ad-Hoc Networks, 2004, pp. 1-5.
De et al., Meshed Multipath Routing with Selective Forwarding: An Efficient Strategy in Wireless Sensor Networks, Computer Networks, Elsevier Science Publishers B.V., Amsterdam, NL, vol. 43, No. 4, Nov. 15, 2003, pp. 481-497.
Lin et al., Location-Based Localized Alternate, Disjoint and Multi-Path Routing Algorithms for Wireless Networks, Journal of Parallel and Distributed Computing, Elsevier, Amssterdam, NL, vol. 63, No. 1, Jan. 2003, pp., 22-32.
Lee et al., "Split Multipath Routing with Maximally Disjoint Paths in Ad hoc Networks," Proceedings of IEEE ICC, 2001, 5 pages.

(Continued)

*Primary Examiner* — Yong Zhou
(74) *Attorney, Agent, or Firm* — Allen, Dyer, Doppelt, Milbrath & Gilchrist, P.A.

(57) ABSTRACT

The method and mobile ad hoc network include the use of a plurality of mobile nodes. A main communication path is established from a source node through intermediate nodes to a destination node. Alternative communication paths are established among intermediate nodes defined as standby nodes to define a multipath communication pathway from the source node to the destination node. The nodes include a controller and a wireless communications device cooperating therewith. Link quality is monitored by at least one intermediate node to neighboring nodes in the multipath communication pathway, and the main communication path is reconfigured within the multipath communication pathway to at least one of the alternative communication paths based upon monitored link quality.

24 Claims, 4 Drawing Sheets

(56) References Cited

OTHER PUBLICATIONS

Marina et al., "On-demand Multipath Distance Vector Routing in Ad Hoc Networks," Proceedings of IEEE ICNP, 2001, 10 pages.

Leung et al., "MP-DSRS: A QoS-aware Multi-path Dynamic Source Routing Protocol for Wireless Ad-Hoc Networks," Proceedings of IEEE (LCN), 2001, pp. 1-10.

Li et al, "On-demand Node-Disjoint Multipath Routing in Wireless Ad hoc Networks," Proceedings of IEEE Local Computer Networks (LCN), Nov. 2004, 2 pages.

Burgess et al., "MaxProp: Routing for Vehicle-Based Disruption-Tolerant Networks," Dept. of Computer Science, University of Massachusetts, Amherst, Jan. 9, 2006, 11 pages.

* cited by examiner

DATA-PATH DYNAMIC LINK MAINTENANCE IN MOBILE AD HOC NETWORKS

FIELD OF THE INVENTION

The present invention relates to the field of communication networks, and, more particularly, to mobile ad hoc wireless networks and related methods.

BACKGROUND OF THE INVENTION

Wireless networks have experienced increased development in the past decade. One of the most rapidly developing areas is mobile ad hoc networks. Physically, a mobile ad hoc network includes a number of geographically-distributed, potentially mobile nodes wirelessly connected by one or more radio frequency channels. Compared with other type of networks, such as cellular networks or satellite networks, the most distinctive feature of mobile ad hoc networks is the lack of any fixed infrastructure. The network is formed of mobile nodes only, and a network is created on the fly as the nodes transmit to or receive from other nodes. The network does not in general depend on a particular node and dynamically adjusts as some nodes join or others leave the network.

In a hostile environment where a fixed communication infrastructure is unreliable or unavailable, such as in a battle field or in a natural disaster area struck by earthquake or hurricane, an ad hoc network can be quickly deployed and provide much needed communications. While the military is still a major driving force behind the development of these networks, ad hoc networks are quickly finding new applications in civilian or commercial areas. Ad hoc networks will allow people to exchange data in the field or in a class room without using any network structure except the one they create by simply turning on their computers or PDAs.

As wireless communication increasingly permeates everyday life, new applications for mobile ad hoc networks will continue to emerge and become an important part of the communication structure. Mobile ad hoc networks pose serious challenges to the designers. Due to the lack of a fixed infrastructure, nodes must self-organize and reconfigure as they move, join or leave the network. All nodes could potentially be functionally identical and there may not be any natural hierarchy or central controller in the network. Many network-controlling functions are distributed among the nodes. Nodes are often powered by batteries and have limited communication and computation capabilities. The bandwidth of the system is usually limited. The distance between two nodes often exceeds the radio transmission range, and a transmission has to be relayed by other nodes before reaching its destination. Consequently, a network has a multihop topology, and this topology changes as the nodes move around.

The Mobile Ad-Hoc Networks (MANET) working group of the Internet Engineering Task Force (IETF) has been actively evaluating and standardizing routing, including multicasting, protocols. Because the network topology changes arbitrarily as the nodes move, information is subject to becoming obsolete, and different nodes often have different views of the network, both in time (information may be outdated at some nodes but current at others) and in space (a node may only know the network topology in its neighborhood usually not far away from itself).

A routing protocol may need to adapt to frequent topology changes and with less accurate information. Because of these unique requirements, routing in these networks is very different from others. Gathering fresh information about the entire network is often costly and impractical. Many routing protocols are reactive (on-demand) protocols: they collect routing information only when necessary and to destinations they need routes to, and do not generally maintain unused routes after some period of time. This way the routing overhead is greatly reduced compared to pro-active protocols which maintain routes to all destinations at all times. It is important for a protocol to be adaptive. Ad hoc On-demand Distance Vector (AODV), Dynamic Source Routing (DSR) and Temporally Ordered Routing Algorithm (TORA) are representative of on-demand routing protocols presented at the MANET working group.

Examples of other various routing protocols include Destination-Sequenced Distance Vector (DSDV) routing which is disclosed in U.S. Pat. No. 5,412,654 to Perkins, and Zone Routing Protocol (ZRP) which is disclosed in U.S. Pat. No. 6,304,556 to Haas. ZRP is a hybrid protocol using both pro-active and reactive approaches based upon distance from a source node.

These conventional routing protocols use a best effort approach in selecting a route from the source node to the destination node. Typically, the number of hops is the main criteria (metric) in such a best effort approach. In other words, the route with the least amount of hops is selected as the transmission route.

In a dynamic ad-hoc network system, path stability is important because links in the path are likely to break. Current ad-hoc mechanisms switch entire paths upon route failures. A broken path results in lost time to switch or re-establish new paths. Maintenance of multiple paths improves the path switching reaction time, but it is done at the complete path level and there is still time lost in propagating the new routing information to all nodes in the path.

Using the routing protocols to address the sudden lost of a data path is a typical approach. Most of the existing approaches are in the domain of the routing level, not the data-path level. Typical ad-hoc network routing protocols in some way address the routing maintenance issue. When a route is broken, it will be detected by a maintenance mechanism, and a new route will be created. Some routing protocols will try to provide routing updates in a periodical fashion, regardless if the routes are being used or not. Unfortunately, routing updates use a lot of the bandwidth resource and there is a significant latency for the route convergence.

Some routing protocols will create or re-discover a route only if it is on-demand. This type of protocol tends to have higher latency in the initial route setup but it is more bandwidth efficient. It may also provide a route maintenance mechanism, for local repair of an active used route. Predictive routing is a higher level of intelligence which schedules and directs the lower layer routing protocols to actively prepare routes by using historical and statistical analysis. It is in fact a high level tuning of the lower layer routing protocols.

Multiple-path approaches exist such as Ad hoc On-demand Multipath Distance Vector (AOMDV) Routing, Ad hoc On-Demand Distance Vector Multipath (AODVM), Node Disjoint Multipath Routing (NDMR), Multipath DSR (MP-DSR), and Split Multipath Routing (SMR). These protocols use different routing mechanisms to setup the multiple paths. Stability is achieved by using one path until it is broken, then shifting to another one. Detecting the break down of a path is required, but a new path is immediately available. All paths may be used and traffic may be shared for load balancing. Duplicate data may be sent on some paths. Bandwidth is wasted but better fault tolerance is achieved with a reduced reaction time.

The link-breaking reaction time is still not minimal. There is a need for an approach that reduces link outage time and enhances the overall effectiveness of multipath routing.

SUMMARY OF THE INVENTION

In view of the foregoing background, it is therefore an object of the present invention to provide a multipath routing approach that reduces link outage time and enhances the overall effectiveness of multipath routing by monitoring and/or predicting link quality.

This and other objects, features, and advantages in accordance with an example of the present invention are provided by a mobile ad hoc network including a plurality of mobile nodes comprising a source node, a destination node, and a plurality of intermediate nodes therebetween configured to establish a main communications path and at least one alternative communication path thereby defining a multipath communication pathway between the source node and the destination node. At least one of the intermediate nodes includes a controller and a wireless communications device cooperating therewith to monitor link quality to neighboring nodes, and to reconfigure the main communication path to the at least one alternative communication path based upon the monitored link quality.

The source node may include a controller having a route discovery unit to establish the main communication path through intermediate nodes to the destination node based on a routing protocol, and to establish the alternative communication paths through intermediate nodes defined as standby nodes that are positioned an "n" hop (e.g. 1-hop) distance from nodes of the main communication path. The at least one intermediate node may include a monitoring unit to monitor link quality to neighboring nodes, and a data distribution unit to distribute data along the multipath communication pathway to the destination node.

The monitoring unit may request a signal-to-noise ratio (SNR) from neighboring nodes and/or estimate the bit error rate (BER) to neighboring nodes. The monitoring unit may predict link quality based upon at least one of a signal-to-noise ratio (SNR) and a bit error rate (BER) to neighboring nodes.

The data distribution unit may distribute data to the destination node using both the corresponding main communication path and at least one of the alternative communication paths. Also, the data distribution unit preferably distributes data to the destination node using a time division multiple access (TDMA) protocol. The route discovery unit may establish the multipath communication pathways to obtain unidirectional and/or bidirectional communication.

Other objects, features, and advantages in accordance with an example of the present invention are provided by a mobile node for a mobile ad hoc network comprising a plurality of mobile nodes including a source node, a destination node, and a plurality of intermediate nodes therebetween configured to establish a main communications path and at least one alternative communication path thereby defining a multipath communication pathway between the source node and the destination node. The mobile node includes a controller and a wireless communications device cooperating therewith to monitor link quality to neighboring nodes, and to reconfigure the main communication path to the at least one alternative communication path based upon the monitored link quality.

The controller may include a route discovery unit to establish main communication paths based on a routing protocol, and to establish alternative communication paths through intermediate nodes defined as standby nodes that are positioned an "n" hop (e.g. 1-hop) distance from nodes of respective main communication paths. A monitoring unit may be included to monitor link quality to neighboring nodes, and a data distribution unit may distribute data along the multipath communication pathway.

Other objects, features, and advantages in accordance with an example of the present invention are provided by a method for operating a mobile ad hoc network comprising a plurality of mobile nodes including a source node, a destination node, and a plurality of intermediate nodes therebetween configured to establish a main communications path and at least one alternative communication path thereby defining a multipath communication pathway between the source node and the destination node. Again, each of the nodes may include a controller and a wireless communications device cooperating therewith. The method includes operating at least one of the intermediate nodes to monitor link quality to neighboring nodes, and operating the at least one intermediate node to reconfigure the main communication path to the at least one alternative communication path based upon the monitored link quality.

The method may also include operating the source node to establish the main communication path through intermediate nodes to the destination node based on a routing protocol, and to establish the alternative communication paths through intermediate nodes defined as standby nodes that are positioned an "n" hop (e.g. 1-hop) distance from nodes of the main communication path.

Monitoring link quality may include requesting a signal-to-noise ratio (SNR) from neighboring nodes and/or estimating the bit error rate (BER) to neighboring nodes. Monitoring link quality may include predicting link quality based upon at least one of a signal-to-noise ratio (SNR) and a bit error rate (BER) to neighboring nodes.

The method may include distributing or forwarding data from the source node to the destination node using the main communication path and/or using both the main communication path and at least one of the alternative communication paths. Data may be forwarded from the source node to the destination node using a time division multiple access (TDMA) protocol, and the main communication path may be established to obtain one of unidirectional and bidirectional communication.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
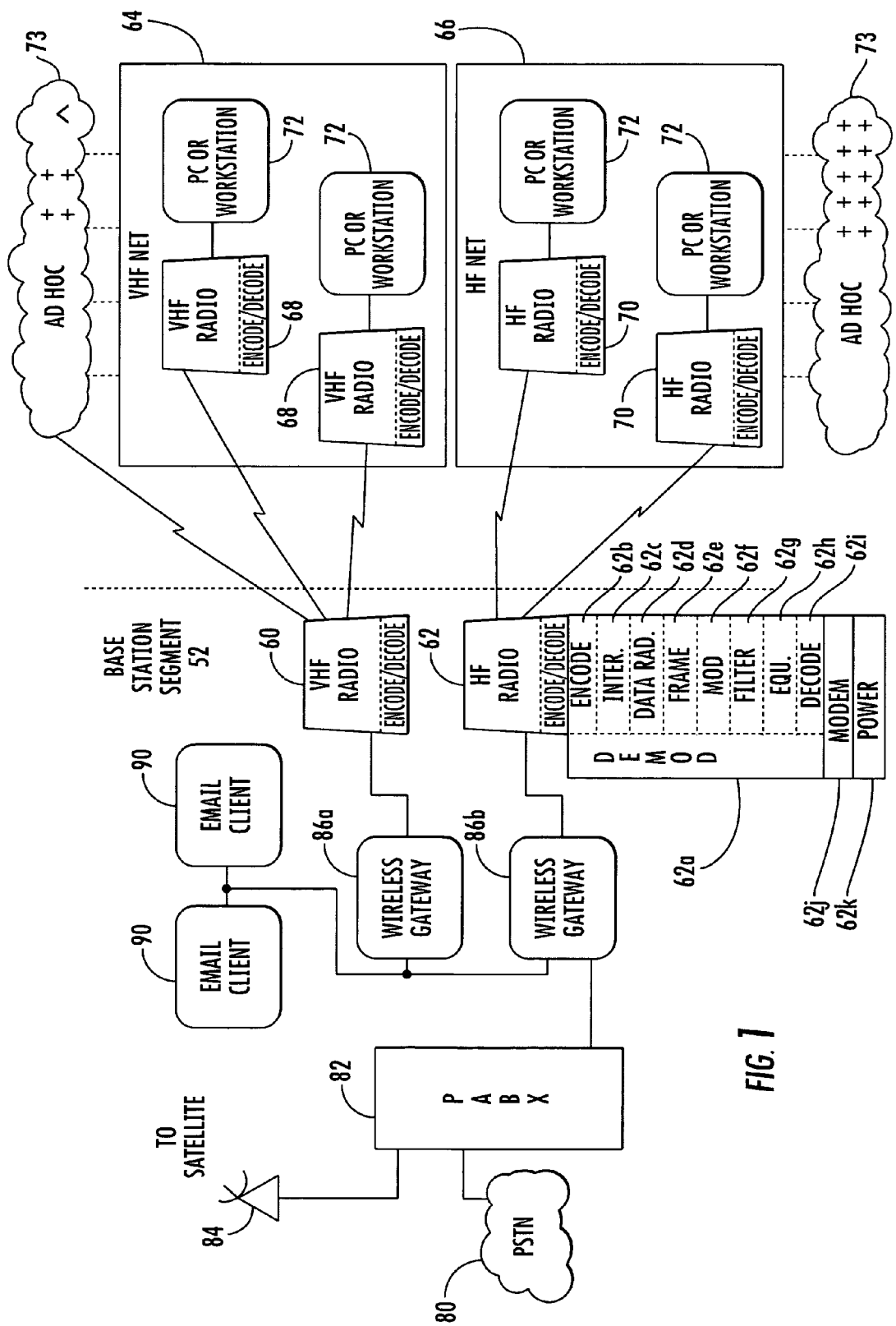
FIG. 1 is a block diagram of an example of a communication system that can be used in accordance with non-limiting examples of the present invention.
Figure 2:
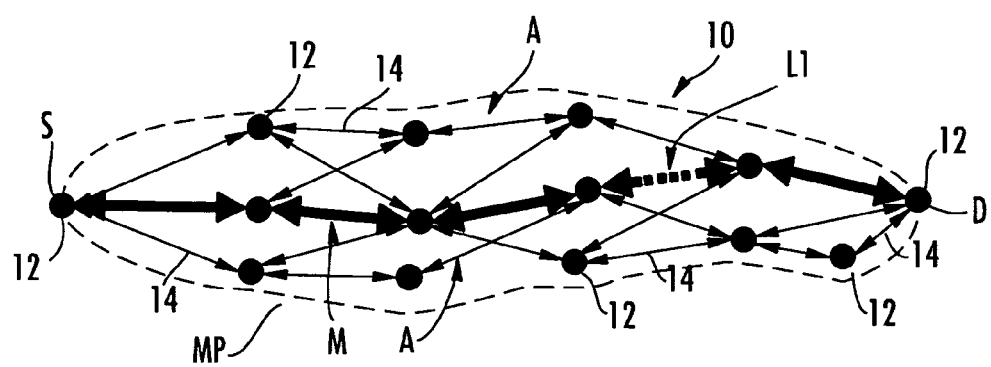
FIGS. 2 and 3 are schematic diagrams illustrating an example of a mobile ad hoc network including a multipath communication pathway between a source node and a destination node in accordance with features of the present invention.
Figure 3:
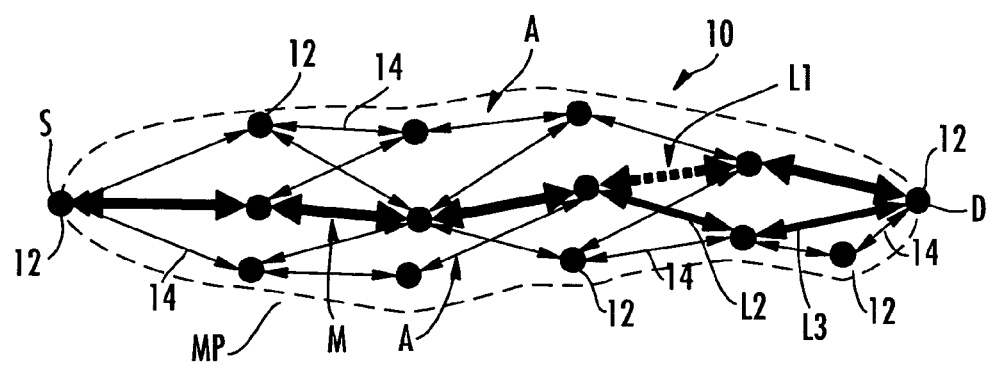
Figure 4:
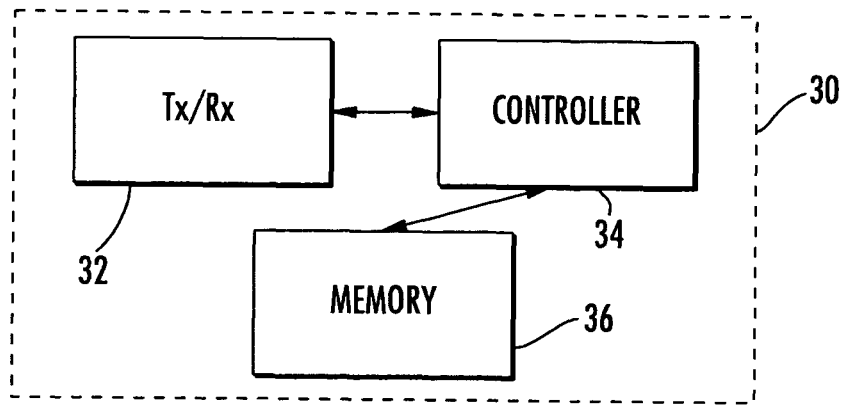
FIG. 4 is a block diagram of an example of a wireless communication node for use in the mobile ad hoc network of FIGS. 2 and 3.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Although the present invention may be applicable to any multipath routing approach, in accordance with non-limiting examples of the present invention, a tube, i.e., "trellis" of multiple communication paths, i.e., also termed multipaths, may be established along a "primary" or main communication path. This structure is similar to a "tube" or "trellis" of nodes and follows the primary or main communication path of nodes. There is a special property of the nodes in this tube or trellis of multiple communication paths, i.e., multipaths (TOMP) for a fully disjoint (FD) and partial disjoint (PD) system. The nodes are aware of the transmission of the neighboring nodes in the TOMP. It should be understood that throughout this description, the acronym TOMP refers to the "tube" or "trellis" of multiple communication paths formed by the nodes in the main communication path from the source to the destination through intermediate nodes, and includes the neighboring, i.e., "standby nodes" located an "n" hop distance. Duplicated transmission thus may not be required to afford fault tolerance. This can be achieved in TDMA systems because the transmissions are sequential.

The construction of the TOMP is dynamic and distributed to the nodes along the primary or main communication path. If the main communication path is broken, another link in the TOMP can automatically replace the broken link and become the new main communication path.

In the TOMP, there is no limitation on the fully disjoint or partial disjoint multi-paths. The nodes in the TOMP are dynamically obtained and locally maintained. The main communication path can be dynamically changed inside the "tube." It can be migrated to adapt to new changes in the topology. The bandwidth usage in the TOMP can be equivalent to that of the single path and at the same time achieving the capability of fault tolerance. The use of TOMP for fault tolerance can be easily configured to support load balancing.

The TOMP can be a mechanism that can support uninterrupted voice service in unstable networks such as ad-hoc networks with link impairments because of fast and slow fading and radio movements. It is simple to implement at a low cost.

For purposes of description, some background information of coding, interleaving, and an exemplary wireless, mobile radio communications system that includes ad-hoc capability and can be modified for use with the system and method of the present invention is now set forth with regard to FIG. 1. An example of a radio that could be used with such system and method is a Falcon™ III radio manufactured and sold by Harris Corporation of Melbourne, Fla., which can be modified for use with mobile ad-hoc networks (MANET's). It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt-.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OF) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

For purposes of description only, a brief description of an example of a communications system that would benefit from the present invention is described relative to a non-limiting example shown in FIG. 1. This high level block diagram of a communications system 50 includes a base station segment 52 and wireless message terminals that could be modified for use with the present invention. The base station segment 52 includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68,70. Ad-hoc communication networks 73 are interoperative with the various components as illustrated. Thus, it should be understood that the HF or VHF networks include HF and VHF net segments that are infrastructure-less and operative as the ad-hoc communications network. Although UHF radios and net segments are not illustrated, these could be included.

The HF radio can include a demodulator circuit 62a and appropriate convolutional encoder circuit 62b, block interleaver 62c, data randomizer circuit 62d, data and framing circuit 62e, modulation circuit 62f, matched filter circuit 62g, block or symbol equalizer circuit 62h with an appropriate clamping device, deinterleaver and decoder circuit 62i modem 62j, and power adaptation circuit 62k as non-limiting examples. These and other circuits operate to perform any functions necessary for the present invention, as well as other functions suggested by those skilled in the art. Other illustrated radios, including all VHF mobile radios and transmitting and receiving stations can have similar functional circuits.

The base station segment 52 includes a landline connection to a public switched telephone network (PSTN) 80, which connects to a PABX 82. A satellite interface 84, such as a satellite ground station, connects to the PABX 82, which connects to processors forming wireless gateways 86a, 86b. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Non-limiting examples of the present invention incorporate a "tube" or "trellis" of multiple communication paths, i.e., multi-paths (TOMP), similar to a tube along a main data or communication path to provide fault tolerance. In the TOMP, transmissions are monitored by the neighboring nodes forming standby nodes. The nodes in TOMP are aware of the transmission of nodes in the main communication path. Duplicated transmission may not be required to afford fault tolerance and can be achieved in TDMA systems because the transmissions are sequential. The construction of a TOMP is dynamic and distributed to the nodes along the primary path.

In TOMP, a local link break in the trellis is monitored by the neighbor nodes in the trellis. It is then repaired after a break is recognized. The approach of the present invention, as will be described in detail below, will actively pick a better link minimizing link outage time and enhancing the overall effectiveness of a multipath routing approach such as TOMP. Link quality monitoring and/or predicting reduces the need to switch entire paths. The reaction time to a broken link is minimized and/or eliminated as link optimization can be locally maintained. QOS is supported better due to less interruption in the path for data delivery.

Referring now to FIGS. 2-5, a mobile ad hoc network (MANET) 10 in accordance with the present will now be described. The MANET 10 includes a plurality of mobile nodes 12, such as laptop computers, personal digital assistants (PDAs) or mobile phones, and a plurality of wireless communication links 14 connecting the plurality of mobile nodes 12 together. The links 14 may be wireless communication channels as would be appreciated by those skilled in the art.

Each mobile node 12 may include a router 30 (FIG. 4) that has a communications device 32 to wirelessly and unidirectionally or bidirectionally communicate with other nodes via the wireless communication links 14, and a controller 34 to route communications via the communications device 32. Also, a memory 36 may be included as part of the controller 34 or in connection with the controller.

Figure 5:
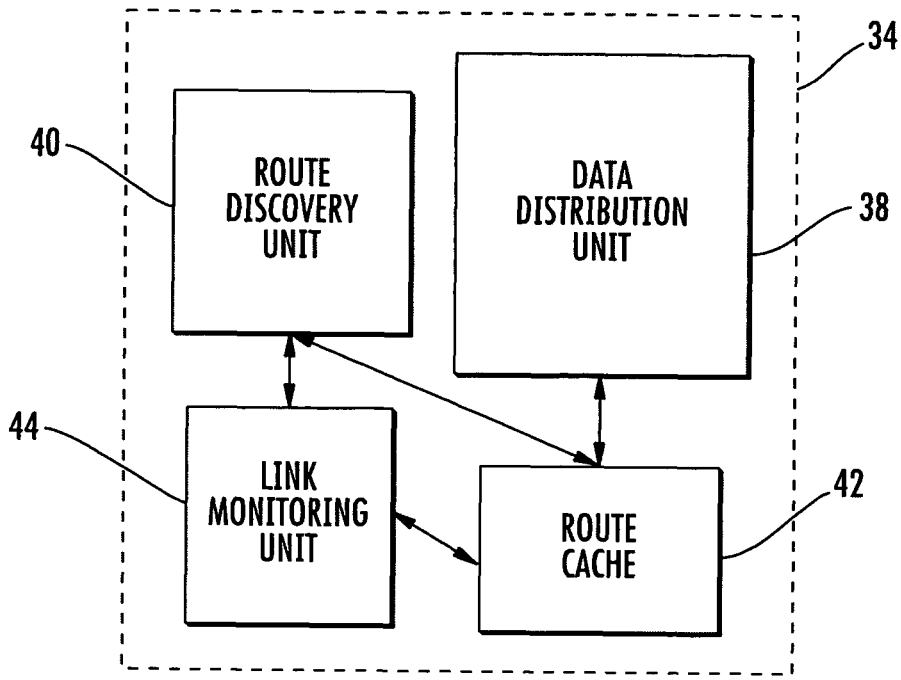
FIG. 5 is a block diagram of an example of a controller for use in the wireless communication node of FIG. 4.

As shown in FIG. 5, the controller 34 may include a route discovery unit 40 to establish a main communication path X, for example from source node S, over the wireless communication links 14 through intermediate nodes to a respective destination node D based on a routing protocol. The route discovery unit 40 also establishes alternative communication paths A among the plurality of mobile nodes 12 defined by standby nodes that are positioned an "n" hop (e.g. 1-hop) distance from nodes 12 of the main communication path M to define a respective multipath communication pathway MP from the source node S to the destination node D. The controller 34 may include a route cache 42 to store route tables associated with the multipath communication pathway MP, as would be appreciated by those skilled in the art.

A monitoring unit 44 monitors link quality to neighboring nodes 12, and a data distribution unit 48 distributes data to the destination node D along at least a corresponding main communication path M. The main communication path M may be reconfigured within multipath communication pathway MP to at least one of the alternative communication paths A based upon the monitored link quality.

The monitoring unit 44 may request a signal-to-noise ratio (SNR) from neighboring nodes and/or estimate the bit error rate (BER) to neighboring nodes. The monitoring unit 44 may predict link quality based upon at least one of a signal-to-noise ratio (SNR) and a bit error rate (BER) to neighboring nodes. Furthermore, the monitoring unit 44 may compare the monitored link quality to a threshold such that the reconfiguration of the main communication path N is based upon the link quality falling below the threshold.

The data distribution unit 48 may distribute data to the destination node D using both the corresponding main communication path M and at least one of the alternative communication paths A. Also, the data distribution unit 48 preferably distributes data to the destination node D using a time division multiple access (TDMA) protocol. The route discovery unit 40 may establish the multipath communication pathway MP to obtain unidirectional and/or bidirectional communication.

Link quality monitoring or predicting for multipath routing preferably provides link diversity (multiple links for data forwarding) in the same data path. Any node 12 in the multipath communication pathway MP may monitor and/or predict the link quality of its forwarding data, e.g. by requesting the SNR and/or estimating the BER. If the link quality is dropping below a threshold (e.g. for link L1 in FIG. 2), then the forwarding node will determine the availability of another link (e.g. L2 and/or L3 in FIG. 3) within the multipath communication pathway MP. Data can be forwarded via both links L1 and L2 for diversity.

Finding a new link is a local process within the multipath communication pathway MP. Global knowledge is not required to make the decision and therefore reaction time to a potentially failing link can be shortened. This proactive approach to changing links with the multipath communication pathway MP will reduce the use of path backup mechanisms (e.g. based upon discovery and repair), thus lowering overhead and increasing throughput.

Approaches consistent with the invention may reduce link outage time and may enhance the overall effectiveness of a multipath routing scheme such as TOMP. Link quality monitoring and/or predicting may reduce the need to switch entire paths. The reaction time to a broken link is reduced and/or eliminated as link optimization can be locally maintained. QOS is supported better due to less interruption in the path for data delivery.

Figure 6:
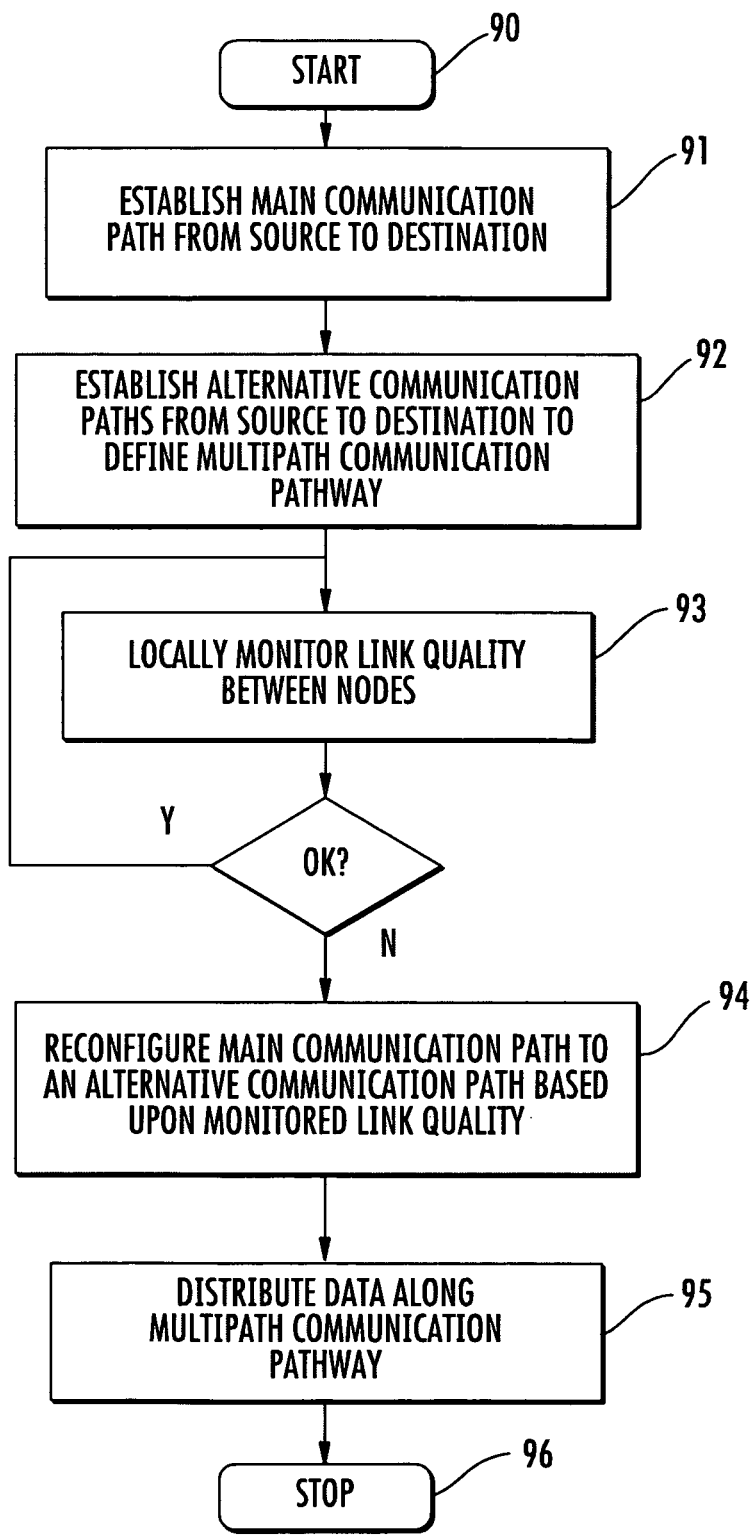
FIG. 6 is a high-level flow chart showing an example of a basic sequence in accordance with one non-limiting example of a method of the present invention.

Another aspect of the invention is directed to a method for operating a mobile ad hoc network 10 and will be described with reference to the high level flowchart of FIG. 6. The method begins at block 90 and includes establishing a main communication path M over wireless communication links 14 between a source node S through intermediate nodes 12 to a destination node D based on a routing protocol (block 91). At block 92, alternative communication paths A are established among the plurality of mobile nodes 12 defined by standby nodes that are positioned an "n" hop distance from nodes of the main communication path M to define a multipath communication pathway MP from the source node S to the destination node D. Link quality is monitored (block 93) between each node 12 in the multipath communication pathway MP. At block 94, the main communication path M is reconfigured within the multipath communication pathway MP to at least one of the alternative communication paths A based upon monitored link quality between nodes 12 in the main communication path M.

The method may include (block 95) forwarding data from the source node S to the destination node D using the main communication path M and/or using both the main communication path M and at least one of the alternative communication paths A before the method ends at block 96. Data may be forwarded from the source node S to the destination node D using a time division multiple access (TDMA) protocol, and the main communication path M may be established to obtain one of unidirectional and bidirectional communication.

The alternative communication paths A may be established from standby nodes that are a 1-hop distance from the nodes of the main communication path. Also, monitoring link quality may include, at each node 12 in the multipath communication pathway MP, requesting a signal-to-noise ratio (SNR) from neighboring nodes and/or estimating the bit error rate (BER) to neighboring nodes. Monitoring link quality may include predicting link quality based upon at least one of a signal-to-noise ratio (SNR) and a bit error rate (BER) to neighboring nodes, Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile ad hoc network comprising:
    a plurality of mobile nodes comprising a source node, a destination node, and a plurality of intermediate nodes therebetween configured to establish a main communications path and at least one alternative communication path thereby defining a multipath communication pathway between said source node and said destination node;
    at least one of said intermediate nodes comprising a controller and a wireless transceiver cooperating therewith to monitor link quality to neighboring nodes, locally determine at least one link from the at least one alternative communication path using at least one standby node within a 1-hop distance of the at least one intermediate node, and to reconfigure the main communication path to include the at least one link from the at least one alternative communication path based upon the monitored link quality and without global network knowledge from the source node.

2. The mobile ad hoc network according to claim 1, wherein the source node comprises a controller including a route discovery unit to establish the main communication path through intermediate nodes to the destination node based on a routing protocol, and to establish the alternative communication paths through intermediate nodes.

3. The mobile ad hoc network according to claim 2, wherein the route discovery unit establishes the multipath communication pathways to obtain one of unidirectional and bidirectional communication.

4. The mobile ad hoc network according to claim 1, wherein the at least one intermediate node comprises a monitoring unit to monitor link quality to neighboring nodes, and a data distribution unit to distribute data along the multipath communication pathway to the destination node.

5. The mobile ad hoc network according to claim 4, wherein the monitoring unit requests a signal-to-noise ratio (SNR) from neighboring nodes.

6. The mobile ad hoc network according to claim 4, wherein the monitoring unit estimates the bit error rate (BER) to neighboring nodes.

7. The mobile ad hoc network according to claim 4, wherein the monitoring unit predicts link quality based upon at least one of a signal-to-noise ratio (SNR) and a bit error rate (BER) to neighboring nodes.

8. The mobile ad hoc network according to claim 4, wherein the data distribution unit distributes data to the destination node using both the corresponding main communication path and at least one of the alternative communication paths.

9. The mobile ad hoc network according to claim 4, wherein the data distribution unit distributes data to the destination node using a time division multiple access (TDMA) protocol.

10. The mobile ad hoc network according to claim 1, wherein the source node, destination node and plurality of intermediate nodes are capable of performing functions so as to be interchangeable.

11. A mobile node for a mobile ad hoc network comprising a plurality of mobile nodes including a source node, a destination node, and a plurality of intermediate nodes therebetween configured to establish a main communications path and at least one alternative communication path thereby defining a multipath communication pathway between said source node and said destination node, the mobile node comprising:
 a controller and a wireless transceiver cooperating therewith to when operating as an intermediate node in the main communications path,
  monitor link quality to neighboring nodes,
  locally determine at least one link from the at least one alternative communication path using at least one standby node within a 1-hop distance of the intermediate node, and
  reconfigure the main communication path to include the at least one link from the at least one alternative communication path based upon the monitored link quality and without global network knowledge from the source node.

12. The mobile node according to claim 11, wherein said controller includes a route discovery unit to establish main communication paths based on a routing protocol, and to establish alternative communication paths through intermediate nodes.

13. The mobile node according to claim 12, wherein said controller includes a monitoring unit to monitor link quality to neighboring nodes, and a data distribution unit to distribute data along the multipath communication pathway.

14. The mobile node according to claim 13, wherein the monitoring unit requests a signal-to-noise ratio (SNR) from neighboring nodes.

15. The mobile node according to claim 13, wherein the monitoring unit estimates the bit error rate (BER) to neighboring nodes.

16. The mobile node according to claim 13, wherein the monitoring unit predicts link quality based upon at least one of a signal-to-noise ratio (SNR) and a bit error rate (BER) to neighboring nodes.

17. The mobile node according to claim 13, wherein the data distribution unit distributes data to the destination node using both the corresponding main communication path and at least one of the alternative communication paths.

18. A method for operating a mobile ad hoc network comprising a plurality of mobile nodes including a source node, a destination node, and a plurality of intermediate nodes therebetween configured to establish a main communications path and at least one alternative communication path thereby defining a multipath communication pathway between the source node and the destination node, each of the nodes comprising a controller and a wireless transceiver cooperating therewith, the method comprising:
 operating at least one of the intermediate nodes to monitor link quality to neighboring nodes, and to locally determine at least one link from the at least one alternative communication path using at least one standby node within a 1-hop distance of the at least one intermediate node; and
 operating the at least one intermediate node to reconfigure the main communication path to include the at least one link from the at least one alternative communication path based upon the monitored link quality and without global network knowledge from the source node.

19. The method according to claim 18, further comprising operating the source node to establish the main communication path through intermediate nodes to the destination node based on a routing protocol, and to establish the alternative communication paths through intermediate nodes.

20. The method according to claim 18, wherein operating the at least one intermediate node to monitor link quality comprises requesting a signal-to-noise ratio (SNR) from neighboring nodes.

21. The method according to claim 18, wherein operating the at least one intermediate node to monitor link quality comprises estimating the bit error rate (BER) to neighboring nodes.

22. The method according to claim 18, wherein operating the at least one intermediate node to monitor link quality comprises predicting link quality based upon at least one of a signal-to-noise ratio (SNR) and a bit error rate (BER) to neighboring nodes.

23. The method according to claim 18, further comprising distributing data from the source node to the destination node along the multipath communication pathway.

24. The method according to claim 23, wherein distributing data further comprises distributing data using a time division multiple access (TDMA) protocol.

\* \* \* \* \*